United States Patent Office 3,410,915
Patented Nov. 12, 1968

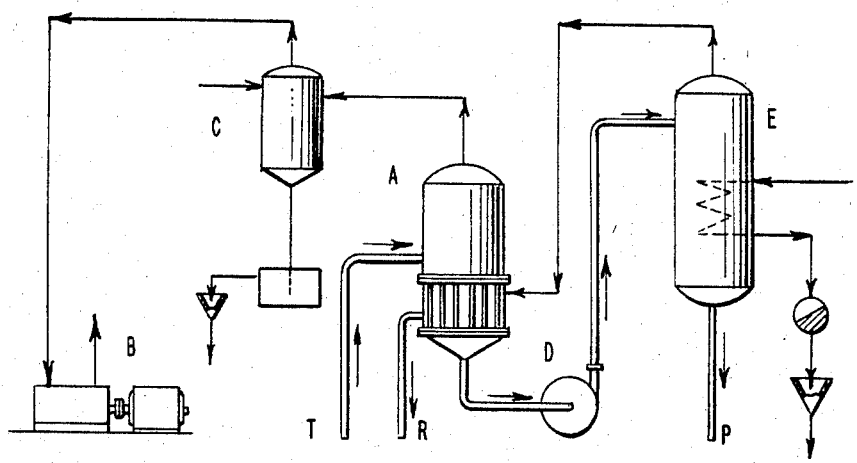
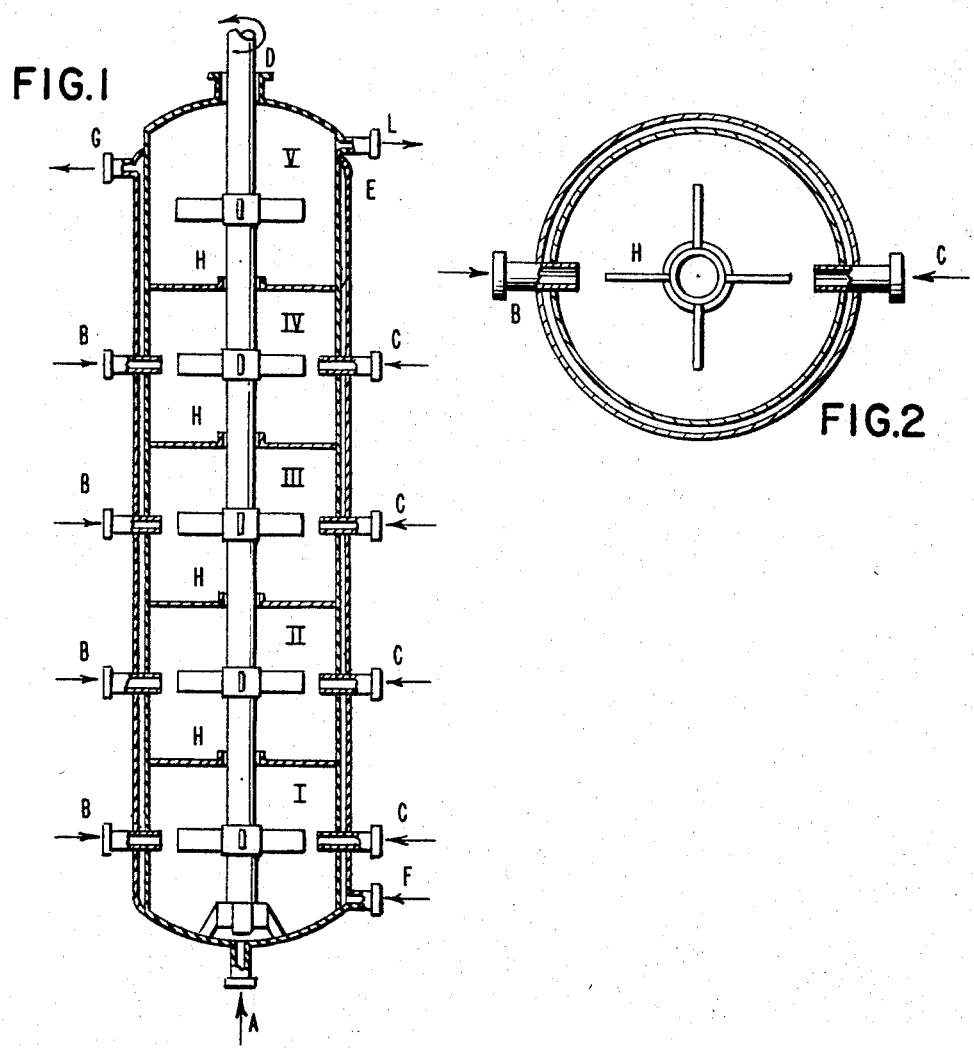

3,410,915
PROCESS FOR CONTINUOUS MANUFACTURE
OF PENTAERYTHRITOL
Guido Greco, Milan, Angelo De Micheli, Saronno, and Umberto Soldano and Vittorio Bruzzi, Milan, Italy, assignors to Montecatini Edison S.p.A., Milan, Italy, a corporation of Italy
Continuation-in-part of application Ser. No. 88,137, Feb. 9, 1961. This application May 17, 1965, Ser. No. 465,229
Claims priority, application Italy, Feb. 18, 1960, 2,821/60
6 Claims. (Cl. 260—635)

This is a continuation-in-part of application Serial No. 88,137, filed Feb. 9, 1961, and relates to an improved, continuous process for manufacture of pentaerythritol, from formaldehyde and acetaldehyde.

Pentaerythritol is generally obtained by condensing acetaldehyde with formaldehyde in aqueous solution, in the presence of an alkaline agent, by the following reaction scheme:

4 $HCHO + CH_3CHO + NaOH \rightarrow C(CH_2OH)_4 + HCOONa$

Various products are found, as for example, polypentaerythritols as well as products derived from the condensation of acetaldehyde with itself. The polypentaerythritols affect the characteristics of the finished product by lowering the pentaerythritol and hydroxyl group content. Other byproducts formed not only have a harmful influence on the characteristics of the product, but also lower the yields.

Many expedients for minimizing the formation of byproducts are known. Generally this is done by using an excess of formaldehyde in respect of acetaldehyde. According to the above reaction scheme, four moles of formaldehyde should be sufficient, but it has been proposed to use a marked excess of formaldehyde over the amount theoretically necessary. In practice this excess reaches up to 15 moles per mole of acetaldehyde. However, the use of a great excess of formaldehyde presents a number of serious problems, for instance in respect to its recovery. Moreover, it makes separation of the pentaerythritol crystals difficult.

We have now found that it is feasible to carry out the reaction continuously and to obtain pentaerythritol, in a simple manner, in high yields and having very good characteristics, even if only a small excess of formaldehyde is employed.

This is achieved by the following particular reaction conditions: (1) Introducing acetaldehyde fractionally into the reaction zone. This insures that, at any time, there is a high ratio of formaldehyde to acetaldehyde present in the reaction zone, despite the fact that the reaction is carried out with a total ratio of formaldehyde to acetaldehyde which is relatively low. (2) Introducing also the alkaline agent fractionally into the reaction zone and in constant proportions to the acetaldehyde in all stages maintaining however always a slight excess of alkali. These are necessary conditions because the complete addition of the alkaline agent in the initial step favors the formation of byproducts and a high consumption of formaldehyde while a minor quantity of alkali in any stage would not allow the completion of the reaction.

This can be carried out either by separately feeding the acetaldehyde and the alkaline agent into a number of reactors connected in series or cascade, or into a plurality of zones provided in a single reactor. Thus, the reaction can be carried out in a reaction vessel comprising a vertical cylindrical vessel provided with stirrer and cooling jacket, and divided into stages (at least two stages) by means of suitable baffles which prevent back-mixing of the reagents passing through it.

To illustrate the invention, but without intent to limit it, we show, in FIGS. 1 and 2 of the drawing, a vertical cylindrical reaction vessel having four reaction stages and a final fifth stage. The acetaldehyde and alkaline agent feeding is carried out fractionally, to the four reaction stages.

FIG. 1 is a vertical section of the reaction vessel;
FIG. 2 is a cross section of said vessel; and
FIG. 3 is a schematic of a separation plant.

An aqueous solution of formaldehyde is continuously fed at the bottom of the reaction vessel of FIG. 1 through nozzle A. The acetaldehyde solution and the sodium hydroxide solution are continuously fed, through nozzles B and C respectively, into stages I, II, III or IV, but preferably not into the last stage V, which acts as a final stage for completing the reaction.

Although the final stage is not absolutely necessary for the practical realization of our invention, it is advantageous in order to prevent outflow of small amounts of unreacted products from the reactor.

The reactor is provided with a stirrer D and a jacket E for temperature regulation. Water is fed through the inlet F and discharged through the outlet nozzle G.

Suitable diaphragms H prevent back-mixing of the reactants in the different stages. The solution passes through the annular space between diaphragms H and stirrer D (FIG. 1), upwardly through the several reaction zones. Obviously, bypass pipes can be used to pass the reaction mixture around or through the diaphragms H.

The pentaerythritol solution thus formed is discharged from the final stage V, through the outlet nozzle L.

Our conditions for the reaction step are as follows:

Total aldehyde concentration at feeding—12 to 15% by weight.
Total molar ratio $CH_2O/CH_3CHO$—from 4.5 to 8 of formaldehyde to 1 of acetaldehyde
Total molar ratio $NaOH/CH_3CHO$—from 1 to 1.3 of sodium hydroxide to 1 of acetaldehyde
Temperatures—40° to 70° C.

The pentaerythritol solutions obtained from the condensation reaction contain pentaerythritol, the said byproducts, the employed excess of formaldehyde, and sodium formate. The liquors must be concentrated and subsequently crystallized, to remove the pentaerythritol crystals for technical use. The remainder of the pentaerythritol, and sodium formate, may be recovered afterwards from the crystallization mother liquors. The pentaerythritol solutions obtained from the condensation reaction are neutralized or slightly acidified to a pH 5.5–6.5 before the concentration stage.

The concentration of the pentaerythritol solutions obtained from the condensation of acetaldehyde with formaldehyde is a very sensitive step in the process. It must be carried out under controlled conditions, to prevent loss of product, or alteration of its characteristics. The pentaerythritol solution, particularly in the final concentration step, must not remain for longer than a certain short period of time at excessive temperatures, since this would affect the phthalic color of the product. Moreover, it is necessary to obtain concentrated solutions containing as little formaldehyde as possible. Formaldehyde increases the solubility of pentaerythritol, and lowers the yields obtained in the subsequent crystallization steps.

Separation of formaldehyde from the pentaerythritol solutions is not only necessary to increase the yields in the crystallization but is also useful for economical reasons, namely to recover the formaldehyde and recycle it into the condensing reactors.

The recycled formaldehyde must be free of methanol and other volatile organic products which adversely affect the condensing reaction.

The volatility characteristics of the formaldehyde in the aqueous solutions obtained in the condensation reaction are actually similar to that of formaldehyde in solutions of formaldehyde and water. When the formaldehyde concentration is quite low, as it is in the solutions obtained from plants manufacturing pentaerythritol, the formaldehyde is more volatile than water at pressures above a critical value, which value is below atmospheric pressure. It is less volatile than water when at pressures which are below said critical value.

We have found a method that allows us to overcome these difficulties. It results in the highest recovery of the excess formaldehyde employed in the reaction zone. It permits the direct recovery of formaldehyde solutions that are free from methanol and other volatile byproducts, and which consequently are suitable for direct recycling to the reaction stage. The low concentration of formaldehyde in the pentaerythritol solutions which are to be crystallized results in high crystallization yields. The pentaerythritol thus manufactured has outstanding chracteristics.

The method employs multi-effect concentrators operating in two or more stages, at a pressure increasing from high vacuum (from 0.05 absolute atmospheres to 0.5 absolute atmospheres) to a pressure of 1-2 absolute atmospheres. In the first stage, that operating under high vacuum, a methanol-water mixture is removed, containing the other volatile byproducts, and practically free from formaldehyde. In the last stage, which operates under atmospheric or under higher pressure, an aqueous formaldehyde solution which is practically methanol-free, is separated from a concentrated pentaerythritol solution containing very little formaldehyde.

The decomposition of pentaerythritol in the stage in which the concentrated solutions are heated to relatively high temperatures is avoided by keeping the dwelling time of the liquid phase in that stage at a minimum. This can be achieved by carrying out the last concentration stages in a film evaporator, for example.

Intermediate stages are not necessary for achievement of all of the essential characteristic results of the invention. However, in an industrial plant, and in order to reduce steam consumption, such intermediate stages can be used for removing aqueous formaldehyde solutions, practically methanol-free. Such solutions can be mixed with the solution separated in the last stage, and recycled as such to the reaction step.

The pentaerythritol solution to be concentrated, coming from the condensation reactor of FIG. 1, is fed into a concentrator A through the pipe T, said concentrator being kept under a high vacuum by vacuum pump B. The methanol and water vapor, coming from A, are condensed in the barometric condenser C and are drained. The concentrated solution leaving A is fed by means of pump D into a film-evaporator E operating at atmospheric or at higher pressures. The water and formaldehyde vapors leaving E are condensed in the heat-exchange apparatus in the lower part of concentrator A. The recovered aqueous formaldehyde solution is directly recycled to the reactors of FIG. 1 through pipe R. The concentrated pentaerythritol solution leaving evaporator E is sent to the next crystallization plant through pipe P.

The scheme described above can be further improved, by adding one or more counter current stripping operations between the liquids and vapors separated in the various concentration steps. Thus, a counter current stripping of the concentrated solution leaving the last step can be carried out, by means of the steam used for the heating in the said last step. A small increase in the plant cost, practically without increase in operation costs, thus produces a further decrease of the formaldehyde content of the concentrated pentaerythritol solution, and in consequence an increase in the crystallization yields is also achieved.

The stripping can be carried out between the feeding solution of the last step and the vapors which are released from it. Similar operations can be carried out also during the other concentration steps.

The operative concentration conditions vary according to the number of steps in which the concentration is carried out. It is essential to operate under a high vacuum (from 0.05 absolute atm. to 0.5 absolute atm.) during the first concentration and to operate at 1–1 absolute atm., and with very short staying times in the last concentration step.

The preferred operative conditions, when the concentration is carried out in two steps and according to our reaction method are the following:

Pressure of the first concentration step—0.1 absolute atm.
Pressure of the second concentration step—1 absolute atm.
Weight ratio of sodium formate to water in the solution at the end of the concentration—0.85

The following examples present a preferred embodiment of the condensation reaction and of the concentration and crystallization steps. Examples 1 and 2 employ both the improved condensation reaction conditions and the improved concentration and crystallization steps. Example 3 employs the prior art condensation reaction conditions in conjunction with the improved concentration and crystallizations steps.

EXAMPLE 1

In the five-stage reactor of an industrial plant for the pentaerythritol manufacture illustrated in FIG. 1, the following amounts of reactants are introduced per hour:

| | Kilograms per hour |
|---|---|
| Formaldehyde | 360 |
| Acetaldehyde | 100 |
| Sodium hydroxide | 109 |

Said reactants are fed in the form of aqueous solutions. 3264 kg./h. water are introduced. The distributions of the acetaldehyde and sodium hydroxide fed into the various stages are as follows:

| | Percent |
|---|---|
| In the first stage | 40 |
| In the second stage | 28 |
| In the third stage | 19 |
| In the fourth stage | 13 |

All of the formaldehyde solution is fed into the first stage. In the stage V no reagent is fed, since this stage acts as reaction finisher. The reactor is kept at constant temperature by water circulating in a jacket. The temperature of the water is adjusted so that the inside of the reactor is at 50° C. The feeding rate of the reactants is adjusted so that the total staying time in the reactor is 1.5 hours. The pentaerythritol solution leaving the reactor is brought to a pH of 6 to 6.5 by adding formic acid. Subsequently, it is transferred to a two-stage concentration plant, the second concentration stage being a film evaporator.

The first concentration stage operates under vacuum at 0.1 absolute atm. It distills about 1500 kg./h. water containing only 7 kg./h. $CH_2O$ and about all the methanol introduced with the feeding formaldehyde of the plant, and containing all the low-boiling byproducts of the reaction. The distillate of the first concentration stage is drained off.

The second concentration stage operates under a pressure of 1 absolute atm. In it 1790 kg./h. of an aqueous 3% by weight formaldehyde solution are distilled. Said solution is recycled as such to the condensation reactor of FIG. 1. Therefore, only 307 kg./h. fresh $CH_2O$ need be introduced into said reactor.

The concentrated pentaerythritol solution leaving the second concentration stage is sent to a crystallization apparatus in which crystallization is carried out continuously at a temperature of from 20 to 25° C.

The liquor obtained is centrifuged and the crystals are washed and dried. Thereby 269 kg./h. of pentaerythritol crystals are obtained, corresponding to an 87% yield based on the acetaldehyde, and about 77% based on the fed formaldehyde.

The crystal has an hydroxy group content corresponding to 47.5% by weight, and has very good color characteristics (phthalic color $\leq$I Gardner scale), and is therefore a very good technical grade product.

From the mother liquors of the first crystallization a portion of the residual pentaerythritol and sodium formate can be recovered according to known methods.

EXAMPLE 2

Into a six-stage reactor of an industrial plant for the pentaerythritol manufacture, equal to that of FIG. 1 but having a further stage, the following amounts of reactants are introduced per hour:

| | Kilograms per hour |
|---|---|
| Formaldehyde | 470 |
| Acetaldehyde | 100 |
| Sodium hydroxide | 110 |

Said reactants are fed in the form of aqueous solutions. 4100 kg./h. water are introduced. The distributions of the acetaldehyde and sodium hydroxide fed into the various stages are as follows:

| | Percent |
|---|---|
| In the first stage | 30 |
| In the second stage | 24 |
| In the third stage | 19 |
| In the fourth stage | 15 |
| In the fifth stage | 12 |

All of the formaldehyde solution is fed into the first stage. In the stage VI no reagent is fed, since this stage acts as reaction finisher. The reactor is kept at constant temperature by water circulating in a jacket. The temperature of the water is adjusted so that the inside of the reactor is at 50° C. The feeding rate of the reactants is adjusted so that the total staying time in the reactor is 1 hour. The pentaerythritol solution leaving the reactor is brought to a pH of 6 to 6.5 by adding formic acid. Subsequently it is transferred to a two-stage concentration plant, the second concentration stage being a film evaporator.

The first concentration stage operates under vacuum at 0.1 absolute atm. It distills about 2100 kg./h. water containing only 15 kg./h. $CH_2O$ and about all the methanol introduced with the feeding formaldehyde of the plant, and containing all the low-boiling byproducts of the reaction. The distillate of the first concentration stage is drained off.

The second concentration stage operates under a pressure of 1.1 absolute atm. In it 1950 kg./h. of an aqueous 7.45% by weight formaldehyde solution are distilled. Said solution is recycled as such to the condensation reactor. Therefore, only 310 kg./h. fresh $CH_2O$ need be introduced into said reactor.

The concentrated pentaerythritol solution leaving the second concentration stage is sent to a crystallization apparatus in which crystallization is carried out continuously at a temperature of from 20 to 25° C.

The liquor obtained is centrifuged and the crystals are washed and dried. Thereby 275 kg./h. of pentaerythritol crystals are obtained, corresponding to an 89% yield based on the acetaldehyde.

The crystal has an hydroxy group content corresponding to 48.5% by weight, and has very good color characteristics (phthalic color $\leq$I Gardner scale), and is therefore a very good technical grade product.

From the mother liquors of the first crystallization a portion of the residual pentaerythritol and sodium formate can be recovered according to known methods.

EXAMPLE 3

(For comparison)

The same amounts of reagents as described in the preceding example are passed into a plant which differs from that of Examples 1 and 2 only in that the reactants are all fed into the first stage of the reactor, with rapid mixing carried out by efficient stirring in a centrifugal pump. The other operating conditions of the reaction phase, and the operating conditions of the subsequent concentration, crystallization, centrifugation and drying steps are the same. Only 193 kg./h. pentaerythritol crystals are obtained, which corresponds to a yield of 62.5% in respect of the fed acetaldehyde.

We claim:

1. A process for continuous production of pentaerythritol, comprising reacting aqueous solutions of formaldehyde, acetaldehyde and sodium hydroxide, said reacting being carried out by moving the aqueous reaction mixture serially through at least two reaction zones, such zones being part of the same reactor, substantially the total formaldehyde employed being added in the first of said reaction zones, fractions of the total acetaldehyde and the sodium hydroxide being fed with constant molar ratio of sodium hydroxide to acetaldehyde to the first and to all the other reaction zones, the total molar ratio of formaldehyde to acetaldehyde being from 4.5 to 8 of formaldehyde to one of acetaldehyde, the total and partial molar ratio of sodium hydroxide to acetaldehyde being from 1 to 1.3 of sodium hydroxide to one of acetaldehyde, the temperature in the reaction being from 40° to 70° C.

2. A process according to claim 1, characterized in that a zone, wherein the reaction is completed without addition of reactants, follows said reaction zones.

3. A process according to claim 2, wherein the reaction mixture leaving the reaction zones is then passed, after being adjusted with an acid to a pH from 5.5 to 6.5, to a multiple effect evaporator in which the evaporation is carried out in the first stage under vacuum at a pressure from 0.05 to 0.5 absolute atmospheres, in the following stages at increasing pressures, and in the last stage at a pressure from 1 to 2 absolute atmospheres.

4. A process for continuous production of pentaerythritol, comprising reacting aqueous solutions of formaldehyde, acetaldehyde and sodium hydroxide, said reacting being carried out by moving the aqueous reaction mixing serially through at least two reaction zones, such zones being in various reactors, substantially the total formaldehyde employed being added in the first of said reaction zones, fractions of the total acetaldehyde and sodium hydroxide being fed with constant molar ratio of sodium hydroxide to acetaldehyde to the first and to all the other reaction zones, the total molar ratio of formaldehyde to acetaldehyde being from 4.5 to 8 of formaldehyde to one of acetaldehyde, the total and partial molar ratio of sodium hydroxide to acetaldehyde being from 1 to 1.3 of alkaline medium to one of acetaldehyde, the temperature in the reaction being from 40° to 70° C.

5. A process according to claim 4, characterized in that a reactor, wherein the reaction is completed without addition of reactants, follows said reaction zones.

6. A process according to claim 5, characterized in that the reaction mixture leaving the last reaction is then passed after being adjusted with an acid to a pH from 5.5 to 6.5, to a multiple effect evaporator, in which the evaporation is carried out in the first stage under vacuum at a pressure from 0.05 to 0.5 absolute atmospheres, in the following stages at increasing pressures, and in the last stage at a pressure from 1 to 2 absolute atmospheres.

References Cited

UNITED STATES PATENTS

| | | |
|---|---|---|
| 3,201,480 | 8/1965 | Danziger et al. |
| 2,790,836 | 4/1957 | Mitchell et al. |
| 2,011,589 | 8/1935 | Paterson. |

BERNARD HELFIN, *Primary Examiner.*

J. E. EVANS, *Assistant Examiner.*